July 4, 1933.  F. LEJEUNE  1,916,484

DIRECT CURRENT MOTOR CONTROL SYSTEM

Filed Dec. 13, 1932

Inventor:—
Fernand Lejeune,
By:— Smith, Michael & Gardiner,
Attorneys.

Patented July 4, 1933

1,916,484

UNITED STATES PATENT OFFICE

FERNAND LEJEUNE, OF PARIS, FRANCE, ASSIGNOR TO FORGES & ATELIERS DE CONSTRUCTIONS ELECTRIQUES DE JEUMONT, SOCIETE ANONYME, OF PARIS, FRANCE

DIRECT CURRENT MOTOR CONTROL SYSTEM

Application filed December 13, 1932, Serial No. 647,062, and in France December 29, 1931.

This invention relates to direct current motor control, particularly for electric traction vehicles. It consists of an improvement in or modification of the control system described in my pending application Serial No. 545,557; the said control system provides for the starting and regenerative braking of the traction motor or motors at substantially constant torque while the speed varies, and provides further for automatic limitation of the motor current to a desired value in order to obviate the commutation at half magnetic flux of a current equal to twice the normal current, for which purpose the independent field of the three-winding exciter is regulated automatically by the differential action of two voltages, viz. a constant voltage (such as that of the supply) and that of the exciter itself, acting in opposition.

The present invention comprises two other arrangements for obtaining the automatic limitation of the motor current; in each case there is employed a second exciter feeding the independent field of the first exciter and driven together with the latter at constant speed, but the differential action is obtained in the one arrangement by opposing the constant voltage of the second exciter to that of the main exciter itself, and in the other arrangement by opposing a constant voltage furnished for example by a potentiometer fed from the supply system to the voltage of the first exciter itself and applying the resultant voltage to excite the field of the second exciter.

The invention is hereafter described with reference to the acompanying drawing, in which:—

Figure 1:
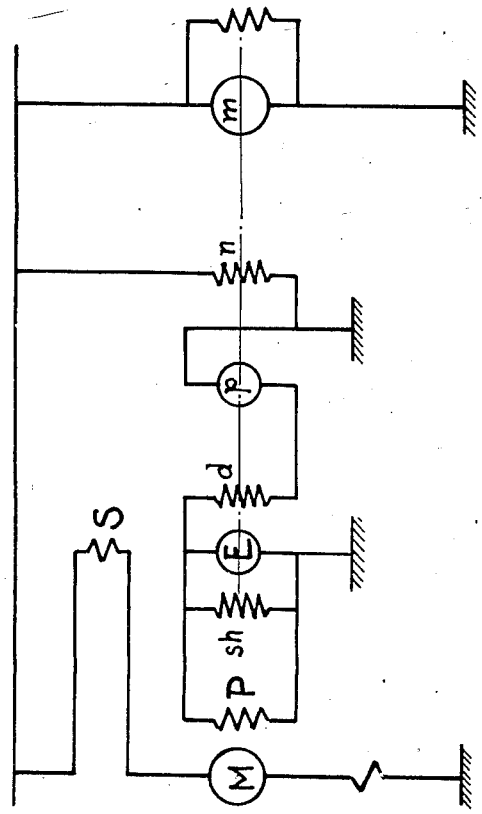
Figure 2:
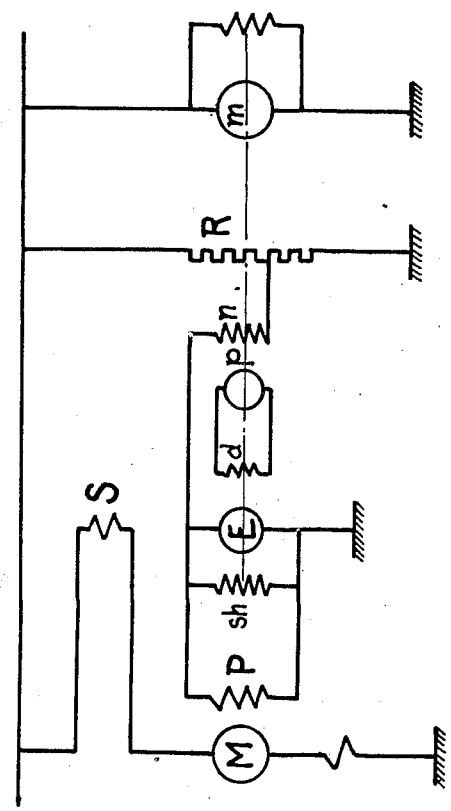

Figures 1 and 2 are diagrams of two motor control systems or arrangements embodying the present improvements.

As in my pending application mentioned above, the traction motor M is shown in both cases provided with a stabilizing series field winding and with an independent field winding P fed by an exciter E driven by a constant speed motor $m$ and having three field windings: shunt ($sh$), independent ($d$) and separate (S), the latter being traversed by the line current to the motor M, and the independent field $d$ acting in opposition to the other two during the start as described in my said pending application.

In Figure 1, the independent winding $d$ of the excited E is fed by two voltages in opposition, viz. that of the three-winding exciter E and that of the second exciter $p$ which is itself excited at constant voltage, for example by the supply system, and coupled mechanically to the motor $m$ driving the main or three-winding exciter E. If the speed of the train is to be doubled, for example, the magnetic flux of the motor M will be reduced to half, its field current in the winding P and therefore the voltage of the exciter E falling to less than half, according to the magnetization curve of the motor. The resultant or difference between the constant voltage of the exciter $p$ and the decreasing voltage of the exciter E, will increase with the rise of speed but at a rate which shows a considerable reduction at higher speeds, so that by suitable selection of the two voltages, the maximum value of the current in the independent field $d$ of the exciter can be limited, thereby also limiting the motor current to a desired maximum by sacrificing acceleration at the higher speeds.

In the second arrangement, shown in Figure 2, the independent field winding $d$ of the three-winding exciter E is fed directly and solely by the second exciter $p$. The field winding $n$ of this latter is itself fed by two opposed voltages: that of the three-winding exciter E and a constant voltage, for example that of the supply system, tapped off from a potentiometer R. Here again the motor current is limited in maximum value, because the current in the independent field winding $d$ of the exciter cannot exceed that determined by a voltage of the exciter $p$ induced by a limited current in the field winding $n$; by adjustment of the potentiometer R, the resultant or differential voltage can be varied to any extent, thereby limiting the motor current as desired.

It will be seen therefore that these two arrangements provide substantially the same control of the maximum motor current as that obtained by the system described in my aforesaid application.

What I claim is:—

1. A direct current motor control system, comprising a motor, an independent field for said motor, a generator for exciting said motor field, said generator having shunt and independent field windings and also a separate field winding excited by the current of said motor, said last-mentioned field winding acting cumulatively with said shunt field winding and in opposition to said independent field winding of said generator during the starting of said motor, and means for feeding said independent field winding of said generator with a current regulated by the difference of two opposing voltages, one of said voltages being that of said generator and the other being constant.

2. A direct current motor control system, comprising a motor, an independent field for said motor, a generator for exciting said motor field, said generator having shunt and independent field windings and also a separate field winding excited by the current of said motor, said last-mentioned field winding acting cumulatively with said shunt field winding and in opposition to said independent field winding of said generator during the starting of said motor, and means for feeding said independent field winding of said generator with a current derived from two opposing voltages, one of said opposing voltages being that of said generator and the other being constant.

3. A direct current motor control system comprising a motor, an independent field for said motor, a generator for exciting said motor field, said generator having shunt and independent field windings and also a separate field winding excited by the current of said motor, said last mentioned field winding acting cumulatively with said shunt field winding and in opposition to said independent field winding of said generator during the starting of said motor, an exciter driven together with said generator and having its field excited by a constant voltage, and means for feeding said independent field winding of said generator with a current derived from two opposing voltages, one of said opposing voltages being that of said generator and the other being that of said exciter.

4. A direct current motor control system, comprising a motor, an independent field for said motor, a generator for exciting said motor field, said generator having shunt and independent field windings and also a separate field winding excited by the current of said motor, said last mentioned field winding acting cumulatively with said shunt field winding and in opposition to said independent field winding of said generator during the starting of said motor, and an exciter driven together with said generator and having its field excited by the resultant of two opposing voltages, one of said voltages being that of said generator and the other being constant, said independent field winding of said generator being fed by said exciter.

5. A direct current motor control system, comprising a motor, an independent field for said motor, a generator for exciting said motor field, said generator having shunt and independent field windings and also a separate field winding excited by the current of said motor, said last mentioned field winding acting cumulatively with said shunt field winding and in opposition to said independent field winding of said generator during the starting of said motor, a potentiometer fed by a constant voltage, and an exciter driven together with said generator and having its field excited by the difference of two voltages, one of said voltages being that of said generator and the other being furnished by said potentiometer, said exciter feeding said independent field winding of said generator.

In testimony whereof I have affixed my signature.

FERNAND LEJEUNE.